US006826551B1

(12) United States Patent
Clary et al.

(10) Patent No.: US 6,826,551 B1
(45) Date of Patent: Nov. 30, 2004

(54) SYSTEM, COMPUTER SOFTWARE PROGRAM PRODUCT, AND METHOD FOR PRODUCING A CONTEXTUAL ELECTRONIC MESSAGE FROM AN INPUT TO A PEN-ENABLED COMPUTING SYSTEM

(75) Inventors: Gregory J. Clary, Apex, NC (US); Edward V. Jolley, Durham, NC (US)

(73) Assignee: Advanced Digital Systems, Inc., Apex, NC (US)

(*) Notice: Subject to any disclaimer, the term of this patent is extended or adjusted under 35 U.S.C. 154(b) by 0 days.

(21) Appl. No.: 09/567,740

(22) Filed: May 10, 2000

(51) Int. Cl.[7] .............................................. G06F 17/00
(52) U.S. Cl. ........................ 706/46; 345/169; 345/158; 345/173; 709/206
(58) Field of Search ............................ 706/47, 20, 15, 706/46, 45, 48; 345/169, 158, 173, 175; 709/206, 219; 178/18.01, 19.01; 719/321, 328

(56) References Cited

U.S. PATENT DOCUMENTS

| 4,793,810 A | 12/1988 | Beasley, Jr. ................. 434/165 |
| D308,364 S | 6/1990 | Beasley, Jr. et al. ........ D14/114 |
| 5,113,041 A | 5/1992 | Blonder et al. ............. 345/173 |
| RE34,476 E | 12/1993 | Norwood ..................... 382/186 |
| 5,287,417 A | 2/1994 | Eller et al. .................. 382/276 |
| 5,347,477 A | 9/1994 | Lee ............................. 708/141 |
| 5,392,390 A | 2/1995 | Crozier ....................... 345/762 |
| 5,465,325 A | 11/1995 | Capps et al. ................ 345/441 |
| 5,493,692 A * | 2/1996 | Theimer et al. ........... 455/26.1 |
| 5,544,295 A | 8/1996 | Capps ......................... 345/473 |
| 5,544,321 A * | 8/1996 | Theimer et al. ............ 709/226 |
| 5,555,376 A * | 9/1996 | Theimer et al. ............ 709/229 |
| 5,559,942 A * | 9/1996 | Gough et al. ............... 345/802 |
| 5,561,446 A | 10/1996 | Montlick .................... 455/26.1 |
| 5,583,543 A | 12/1996 | Takahashi et al. .......... 345/173 |

(List continued on next page.)

FOREIGN PATENT DOCUMENTS

| WO | WO 01/16691 A1 | 3/2001 |
| WO | WO 01/25891 A1 | 4/2001 |

OTHER PUBLICATIONS

Nathan et al., "Real–Time On–Line Unconstrained Handwriting Recognition Using Statistical Methods", 1995 Intl Conference on Acoustics, Speech and Signal Processing, May 1995, vol. 4, pp. 2619–2622.*

(List continued on next page.)

*Primary Examiner*—Wilbert L. Starks, Jr.
*Assistant Examiner*—Kelvin Booker
(74) *Attorney, Agent, or Firm*—Alston & Bird LLP (57) ABSTRACT

A system for producing a contextual electronic message generally comprises a handwriting capture device, a user interface, a central processing unit, and a communications interface. The handwriting capture device is capable of receiving and capturing an electronic handwriting input. The user interface is adapted to interact with a user and is further capable of receiving a user input to initiate a processing function. The central processing unit is capable of determining the context of the handwriting input and application-specific information associated therewith, as well as process the handwriting input in accordance with the context and/or the initiated processing function. A contextual electronic message is thereby produced which may comprise a portion of the application-specific information and/or a portion of the handwriting input. The communications interface is adapted to interact with a message recipient through a communications link and is further capable of transmitting the electronic message thereto.

26 Claims, 8 Drawing Sheets

U.S. PATENT DOCUMENTS

| | | | | |
|---|---|---|---|---|
| 5,587,560 A | * | 12/1996 | Crooks et al. | 178/18.03 |
| 5,596,694 A | | 1/1997 | Capps | 345/473 |
| 5,600,735 A | * | 2/1997 | Seybold | 382/178 |
| 5,603,054 A | * | 2/1997 | Theimer et al. | 710/6 |
| 5,611,050 A | * | 3/1997 | Theimer et al. | 709/202 |
| 5,625,833 A | | 4/1997 | Levine et al. | 715/500 |
| 5,629,499 A | | 5/1997 | Flickinger et al. | 178/18.01 |
| 5,666,530 A | | 9/1997 | Clark et al. | 707/201 |
| 5,680,636 A | | 10/1997 | Levine et al. | 715/512 |
| 5,682,439 A | | 10/1997 | Beernink et al. | 382/187 |
| 5,737,443 A | * | 4/1998 | Guzik et al. | 382/188 |
| 5,737,740 A | | 4/1998 | Henderson et al. | 715/530 |
| 5,740,273 A | * | 4/1998 | Parthasarathy et al. | 382/187 |
| 5,742,705 A | * | 4/1998 | Parthasarathy | 382/185 |
| 5,751,851 A | * | 5/1998 | Guzik et al. | 382/179 |
| 5,787,312 A | | 7/1998 | Suzuki | 710/74 |
| 5,797,089 A | | 8/1998 | Nguyen | 455/403 |
| 5,812,865 A | * | 9/1998 | Theimer et al. | 709/228 |
| 5,818,425 A | | 10/1998 | Want et al. | 345/158 |
| 5,838,819 A | | 11/1998 | Ruedisueli et al. | 382/187 |
| 5,898,156 A | * | 4/1999 | Wilfong | 235/380 |
| 5,903,666 A | * | 5/1999 | Guzik et al. | 382/179 |
| 6,005,973 A | * | 12/1999 | Seybold et al. | 382/187 |
| 6,141,570 A | * | 10/2000 | O'Neill et al. | 455/574 |
| 6,151,611 A | * | 11/2000 | Siegel | 715/541 |
| 6,304,898 B1 | * | 10/2001 | Shiigi | 709/206 |
| 6,311,042 B1 | * | 10/2001 | DeSchrijver | 455/66.1 |
| 6,317,797 B2 | * | 11/2001 | Clark et al. | 710/5 |
| 6,323,803 B1 | * | 11/2001 | Jolley et al. | 342/357.03 |
| 6,396,481 B1 | * | 5/2002 | Challa et al. | 345/169 |
| 6,408,178 B1 | * | 6/2002 | Wickstrom et al. | 455/427 |
| 6,431,439 B1 | * | 8/2002 | Suer et al. | 235/380 |
| 6,463,413 B1 | * | 10/2002 | Applebaum et al. | 704/256 |
| 6,564,249 B2 | * | 5/2003 | Shiigi | 709/206 |
| 6,615,183 B1 | * | 9/2003 | Kolls | 705/26 |
| 2001/0038711 A1 | * | 11/2001 | Williams et al. | 382/181 |

OTHER PUBLICATIONS

Nosary et al., "A Step Towards The Use of Writer's Properties For Text Recognition", IEE Third European Workshop on Handwriting Analysis and Recognition, Jul. 1998, pp. 16/1–16/6.*

Elliman et al., "The Use of Extended Trigrams For Contextual Word Recognition", IEE Workshop on Handwriting Analysis and Recognition–A European Perspective, May 1996, pp. 10/1–10/5.*

Downton et al., "Lazy Evaluation for Best–First Contextual Handwriting Recognition", Proceedings of the 5th Intl Conference on Document Analysis and Recognition, Sep. 1999, pp. 589–592.*

Amano et al., "DRS: A Workstation–Based Document Recognition System for Text Entry", Computer, Jul. 1992, vol. 25, Iss 7, pp. 67–71.*

Du et al., "Computationally Efficient Contextual Processing for Handwritten Forms", IEE Workshop on Handwriting Analysis an Recognition–A European Perspective, May 1996, pp. 8/1–8/5.*

Downton et al., "Visual Programming Paradigms for Handwriting Applications", IEE European Workshop on Handwriting Analysis and Recognition: A European Perspective, Jul. 1994, pp. 24/1–24/8.*

Pavlidis et al., "Off–Line Recognition of Signatures Using Revolving Active Deformable Models", 1994 IEEE International Conference on Systems, Man and Cybernetics, Oct. 1994, vol. 1, pp. 771–776.*

Kim et al., "Handwritten Word Recognition for Real–Time Applications", Proceedings of the 3rd International Conference on Document Analysis and Recognition, Aug. 1995, vol. 1, pp. 24–27.*

Munich et al., "Visual Input for Pen–Based Computers", Proceedings of the 13th Infl Conference on Pattern Recognition, Aug. 1996, vol. 3, pp. 33–37.*

Smithies, CPK, "The Handwritten Signature in Pen Computing", IEE Colloquium on handwriting and Pen–Based Input, 1994, pp. 2/1–2/3.*

Beigi et al., "Size Normalizaiton in On–Line Unconstrained Handwriting Recognition", IEEE International Conference on Image Processing, Nov. 1994, vol. 1, pp. 169–173.*

Jeremy M. Heiner, Scott E. Hudson, Kenichiro Tanaka; *Linking and Messaging from Real Paper in the Paper PDA; Proceedings of the 12th Annual ACM Symposium on User Interface Software and Technology* Online!; Nov. 1999; pp. 179–186; vol. 1, No. 1; XP002177313; Asheville, North Carolina, USA; Retrived from the Internet: <URL:http://www.acm.org/pubs/citations/proceedings/uist/320719/p179-heiner> (retrieved on Sep. 6, 2001).

Patent Cooperation Treaty—Notification of Transmittal of the International Search Report or the Declaration; International Searching Authority; regarding PCT / US 01/14009, filed May 1, 2001; mailed Sep. 26, 2001; Application Advanced Digital Systems, Inc.

* cited by examiner

SYSTEM, COMPUTER SOFTWARE PROGRAM PRODUCT, AND METHOD FOR PRODUCING A CONTEXTUAL ELECTRONIC MESSAGE FROM AN INPUT TO A PEN-ENABLED COMPUTING SYSTEM

FIELD OF THE INVENTION

The present invention relates to data processing involving pen-enabled computing systems and, more particularly, to a system, computer software program product, and method for producing a contextual electronic message from an input to a pen-enabled computing system.

BACKGROUND OF THE INVENTION

Pen-enabled computing is a relatively recent development wherein a user interfaces with a computing system by way of a writing stylus instead of a mouse or a keyboard. In some instances, a pen-enabled computing system provides an electronic writing tablet having an overlaid writing surface. Such a writing surface may comprise, for example, a blank sheet of paper or a preprinted form. The writing stylus, in turn, may comprise a device capable of inputting data (a "handwriting input") into the pen-enabled computing system while providing both a visible, or "written ink," copy of the data on the writing surface and an "electronic" copy of the data within the pen-enabled computing system. Such a writing stylus may comprise, for example, a conventional pen, a conventional pencil, a radio transmitter, a magnetic or electric field device, an ultrasound transceiver, or combinations thereof.

Once the electronic copy of the data is entered into the pen-enabled computing system, the data may be stored as an "electronic ink" copy, wherein the handwriting input is captured as written, or as a "text" copy, wherein the handwriting input is captured, recognized, and translated into the corresponding text. In some instances, the pen-enabled computing system may be capable of producing both an electronic ink and a text copy of the handwriting input. Since the writing stylus is generally capable of providing a written ink copy of the handwriting input on the writing surface, the user is automatically provided with a hard copy, or visual feed back, of the entered data. It is understood, however, that a written ink copy of the handwriting input may not be provided in some instances, wherein the handwriting input is captured and stored in the pen-enabled computing system as an electronic copy.

Typically, the pen-enabled computing system senses the position and/or movement of the writing stylus with respect to the electronic writing tablet, which is stored in the pen-enabled computing system as the handwriting input. The handwriting input is often then desirably used for other purposes. In order to manipulate the handwriting input, the pen-enabled computing system may communicate with a separate computer or processor to exchange, view, or modify the data. However, for the handwriting input to be subsequently utilized, it must often be translated from the user's handwriting to text form. While text translation schemes may facilitate practical uses for the handwritten data, they are often not able to accurately translate the user's handwriting. In addition, translation routines may require additional processing and storage capacity which could be used for other purposes and may add size and cost to the pen-enabled computing system. Thus, there exists a need for a pen-enabled computing system being selectively capable of utilizing a handwriting input for subsequent purposes without necessarily requiring the handwriting input to first be translated into text form.

The utilization of handwriting input into a pen-enabled computing system for subsequent processing purposes was facilitated by the development of systems capable of determining the context of the handwritten data. However, prior art systems for determining handwriting input context often required the user to positively identify the context of the data that they were entering. An improvement to these context identification systems provided a pen-enabled computing system integrating a preprinted form, wherein the improved system provided the capability of identifying the form and the context of the handwriting input from data input into a plurality of fields associated with the form. In some instances, the system had the capability of identifying the form and the handwriting input context from the user using the form for the form's intended purpose. For example, the improved system was capable of identifying that the form comprised a daily planner from an entry in a certain time period on the form. Once the context of the input was known, associated data could be recalled and displayed for the user or the input could be used for other purposes. The details of such an improved system are found in U.S. patent application Ser. No. 60/127,196 to Clary, entitled "System, Computer Program Product, Computing Device, and Associated Methods for Form Identification and Information Manipulation," filed Mar. 31, 2000, assigned to Advanced Digital Systems, Inc., also the assignee of the present invention, and hereby incorporated herein by reference in its entirety. While the Clary system provided an improvement in the seamless and automated operation of a pen-enabled computing system utilizing a preprinted form, it envisioned the need for new applications which would further expand the capabilities of a pen-enabled computing systems in a continued seamless and automated operation.

SUMMARY OF THE INVENTION

The above and other needs are met by the present invention which, in one embodiment, provides a system for producing a contextual electronic message from an input received by a handwriting capture device. Generally, the system comprises a handwriting capture device, a user interface, a central processing unit, and a communications interface. The handwriting capture device is capable of receiving and capturing an electronic handwriting input. The user interface is adapted to interact with a user and is further capable of receiving a user input to initiate a processing function. The central processing unit is capable of determining the context of the handwriting input and application-specific information associated with the handwriting input context. The central processing unit is also capable of processing the handwriting input in accordance with the context and/or the initiated processing function. A contextual electronic message is thereby produced which may comprise a portion of the application-specific information and/or a portion of the handwriting input. The communications interface is adapted to interact with a message recipient through a communications link and is further capable of transmitting the electronic message thereto.

The system may further comprise a computer software program product executing in at least one of the handwriting capture device and the central processing unit. The computer program product is capable of, for example, capturing the handwriting input, determining the context thereof, determining the application-specific information associated with the handwriting input context, processing the handwriting input according to the context and/or the initiated processing function to produce the corresponding contextual electronic message, and transmitting the message via the communications interface. In some instances, the computer program product is capable of using the application-specific information to determine a status of the message recipient prior to transmitting the electronic message.

According to further embodiments, the handwriting capture device may comprise a writing stylus having an associated sensing device for selectively sensing stylus movements. For example, the sensing device may comprise a pen-enabled computer, an electronic handwriting tablet, or a device that cooperates with the writing stylus to generate data from which the position and movement of the writing stylus can be determined. In addition, the user interface may comprise at least one actuator capable of receiving the user input and initiating the corresponding processing function. The user interface may also comprise at least one indicator adapted to provide data to the user. Further, the central processing unit may comprise, for example, a pen-enabled computer, a personal digital assistant, a smart phone, a desktop personal computer, a laptop personal computer, a central server, or combinations thereof. The communications interface may comprise, for example, a wireless communications device or a wire line communications device, each adapted to provide a communications link between the system and an external computing device. Still further, the electronic message produced by the system may comprise a source address, a destination address, a subject, a time stamp, and/or a payload, wherein at least a portion of the payload may comprise the application-specific information and/or at least a portion of the handwriting input.

A further advantageous aspect of the present invention comprises a computer software program product executing within a messaging system, wherein the computer program product is capable of producing a contextual electronic message from an input received by a handwriting capture device. The computer program product may comprise several executable portions that cooperate to capture a handwriting input and process the handwriting input to form a contextual electronic message that may then be transmitted to a message recipient. Accordingly, a first executable portion is provided that is capable of receiving and capturing a handwriting input entered into a handwriting capture device, wherein the handwriting input has a predetermined input parameter. A second executable portion is then capable of determining the context of the handwriting input based at least partially upon the input parameter. The second executable portion is further capable of determining application-specific information associated with the handwriting input context. A third executable portion processes the handwriting input based on a user input to a user interface and/or the handwriting input context to thereby form a contextual electronic message. The contextual electronic message may comprise, for example, a portion of the application-specific information and/or a portion of the handwriting input. A fourth executable portion then transmits the message via a communications interface, wherein the communications interface is adapted to interact with a message recipient through a communications link.

In one embodiment, the messaging system comprises a central processing unit in communication with the handwriting capture device, the user interface, and the communications interface. At least one of the executable portions is executed within the central processing unit, wherein the central processing unit may comprise, for example, a pen-enabled computer, a personal digital assistant, a smart phone, a desktop personal computer, a laptop personal computer, a central server, or combinations thereof. In some instances, at least one executable portion is executed within the handwriting capture device, wherein the handwriting capture device may comprise, for example, a pen-enabled computer, an electronic handwriting tablet, a writing stylus having an associated sensing device for selectively sensing stylus movements, or a device that cooperates with the writing stylus to generate data from which the position and movement of the writing stylus can be determined.

In some instances, the input parameter comprises a form identifier, wherein the second executable portion of the software program product is capable of determining the handwriting input context at least partially from the form identifier. In addition, at least one executable portion of the computer program product is capable of associating the application-specific information with an executable function. Also, at least one executable portion is capable of controlling the user interface such that the user interface may be directed to display data associated with the handwriting input context, wherein the user interface has at least one indicator adapted to provide the data to the user. At least one executable portion may also assign, for example, a time or date stamp to the handwriting input. The computer program product may further comprise a fifth executable portion capable of controlling the communications interface and directing the communications interface to interact with the message recipient, wherein the fifth executable portion is capable of polling a status of the message recipient with respect to the contextual electronic message prior to transmitting the message. Once the status of the message recipient is assessed, at least one of the executable portions may execute a predetermined function associated with the assessed status.

Still a further advantageous aspect of the present invention comprises a method for producing a contextual electronic message from a handwriting input to a handwriting capture device. A handwriting input having a predetermined input parameter is first entered into and captured by a handwriting capture device. The context of the handwriting input is then determined based at least partially upon the input parameter. Application-specific information associated with the handwriting input context may also be determined. A contextual electronic message is then formed based upon the handwriting input context and/or a user input received from a user interface, wherein the electronic message may comprise a portion of the application-specific information and/or a portion of the handwriting input. The message is then transmitted via a communications interface adapted to interact with a message recipient through a communications link.

In some instances, capturing a handwriting input further comprises selectively sensing movements of a writing stylus with a handwriting capture device, wherein the handwriting capture device may comprise, for example, a pen-enabled computer, an electronic handwriting tablet, a writing stylus having an associated sensing device, or a device that cooperates with the writing stylus to generate stylus movement data. Further, the input parameter may comprise a form identifier, at least partially from which the context of the handwriting input may be determined. In addition, the application-specific information may be associated with an executable function. Data associated with the handwriting input context may also be displayed via the user interface, wherein the user interface has at least one indicator adapted to provide data to the user.

When the handwriting input is captured, it may be assigned a time or date stamp, wherein a contextual electronic message may be formed such that the message is based upon or comprises the time or date stamp. In some instances, a status of a message recipient may be polled with respect to the contextual electronic message prior to transmitting the message to the message recipient. For example, the status of the message recipient may be assessed and a predetermined function then executed, wherein the predetermined function is associated with the assessed status. The contextual electronic message sent to the message recipient may comprise a source address, a destination address, a subject, a time stamp, or payload, wherein at least a portion of the payload comprises the application-specific information or at least a portion of the handwriting input.

Thus, a system, computer software program product, and method for producing a contextual electronic message from an input to a pen-enabled computing system according to embodiments of the present invention provides a system capable of utilizing a handwriting input for subsequent purposes and, in some instances, may do so without requiring the handwriting input to first be translated into text form. Further, embodiments of the present invention facilitate improvement in the seamless and automated operation of a pen-enabled computing system utilizing a preprinted form by providing useful applications which further expands the capabilities of pen-enabled computing systems.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
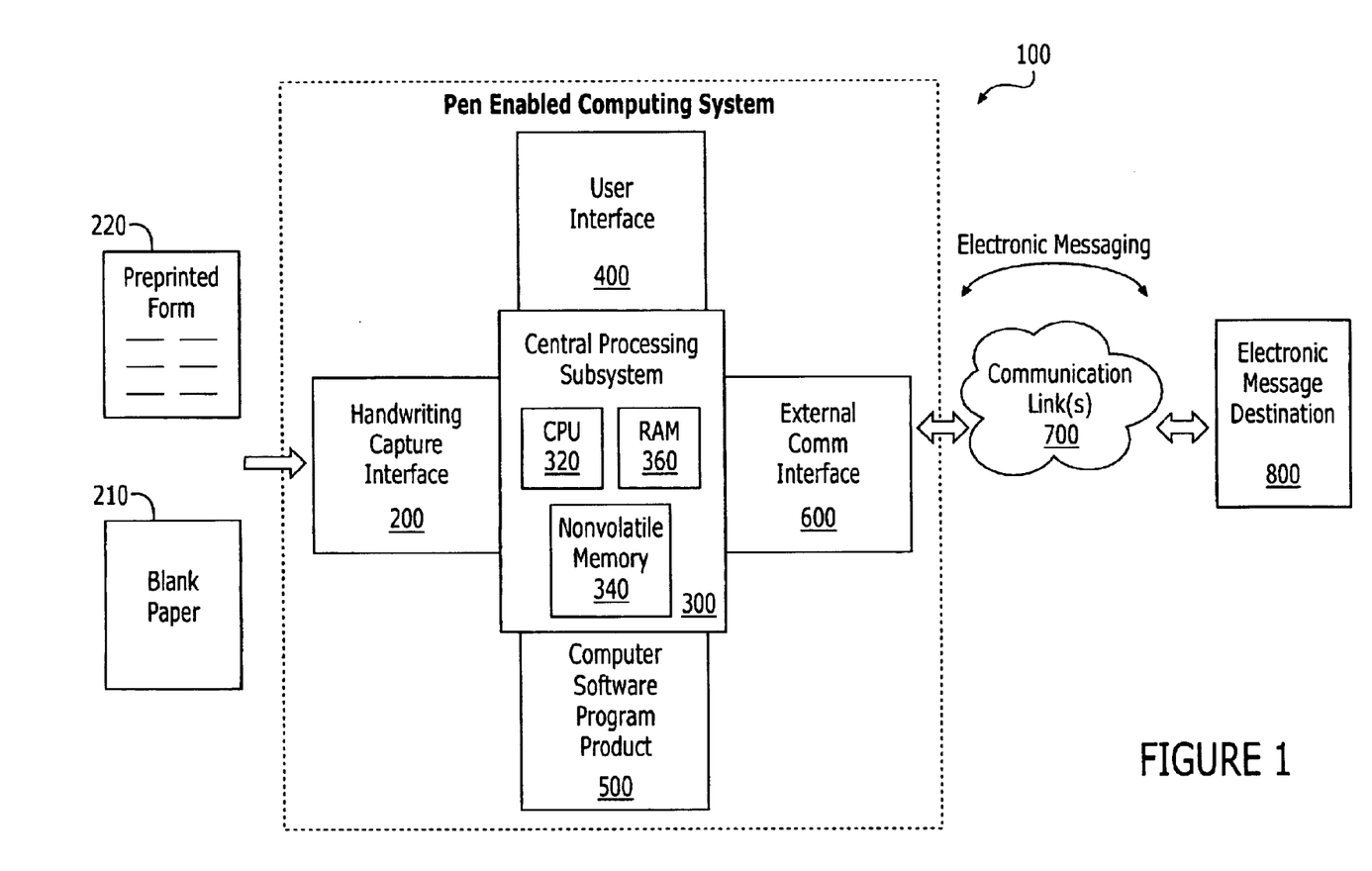
FIG. 1 is a schematic of a system for producing a contextual electronic message from an input to a pen-enabled computing system according to one embodiment of the present invention.

FIG. 1 is a schematic of a system for producing a contextual electronic message from an input to a pen-enabled computing system according to one embodiment of the present invention, the system being indicated generally by the numeral 100. The system 100 generally comprises a handwriting capture interface 200, a central processing subsystem 300, a user interface 400, a computer software program product 500, and an external communications interface 600. The handwriting capture interface 200 generally comprises an apparatus for sensing the movements of a writing stylus. The writing stylus is typically a writing instrument which may be capable of creating visible marks upon a writing surface such as, for example, a blank of piece of paper 210 or a paper-based preprinted form 220. In a particularly advantageous embodiment of the present invention, the handwriting capture interface 200 comprises a writing stylus and an electronic handwriting tablet area. The stylus and the handwriting tablet are interfaced such that the position or motion of the writing stylus, corresponding to writing strokes, with respect to the handwriting tablet can be detected and captured by the system 100. The stylus may interact with the handwriting tablet such that the position or motion of the stylus is detected when proximate to the tablet or, alternatively, in direct contact with the handwriting tablet. One or more of a blank paper sheet or preprinted form may, in some instances, be positioned between the stylus and the handwriting tablet to provide a written ink copy of the writing strokes. In some instances, a handwriting tablet may not be necessary if the position and motion of the writing stylus may be directly detected by the handwriting capture interface 200 or the system 100. It is also understood, however, that a written ink copy of the writing strokes may not be provided in some instances, for example, where a paper sheet or form is not provided, wherein the writing strokes are only captured and stored in the pen-enabled computing system as an electronic copy.

At least partially driving the handwriting capture interface 200 is the central processing subsystem 300. The central processing subsystem 300 may comprise, for example, a central processor unit 320, non-volatile memory storage 340, and RAM storage 360. The central processing unit (CPU) 320 is generally capable of executing all computer processing activities required to support the system 100. Non-volatile memory resources 340 such as, for example, an EEPROM or a disk, are typically used for storing and/or executing a computer software program product 500 as well as storing useful data such as, for example, electronic ink. Further, the RAM storage 360 is used for loading and executing the computer software program product 500. The central processing subsystem 300 may be embodied in, for example, a pen enabled computer, a personal digital assistant, a laptop personal computer, a desktop personal computer, a smart phone, a central server, or combinations thereof.

The user interface 400 includes provisions for facilitating interaction between the system 100 and a user. The user interface 400 may comprise, for example, one or more actuators, such as buttons or other electromechanical devices, for initiating functions within the system 100 where, in some instances, the buttons may comprise a part of a keyboard or a keypad. However, such actuators may be embodied in many different manners, for instance, in software, hardware, or a combination of software and hardware. The user interface 400 may also comprise an apparatus for allowing the user to view displayed data or status information such as, for example, a viewing screen or monitor. In some instances, the user interface 400 may also include an audio mechanism such as, for example, a buzzer, bell, or other indicator, a device capable of supporting voice interaction between the system 100 and the user, and an interactive display. Still further, for example, a vibration mechanism may also be used as an alert or acknowledgement indicator. In addition, such indicators may be embodied in many different manners, for instance, in software, hardware, or a combination of software and hardware.

The computer software program product 500 cooperates with the central processing subsystem 300 to control the system 100. The computer software program product 500 further drives the handwriting capture interface 200 to interface and cooperate with a writing stylus, in some instance, through blank paper or certain preprinted forms. Note that while reference is made herein to interaction with a preprinted form, such reference is equally applicable to a blank piece of paper in accordance with the spirit and scope of the present invention. Thus, according to one embodiment, the computer software program product 500 enables the system 100 to, for example, sense a form identifier associated with the preprinted form, wherein the function and physical page of the preprinted form may be electronically identified. Such form identifiers may comprise, for example, a particular input field associated with a form type, a form page, or a sub-area on a form, the particular spatial arrangement of input fields on a form, a voice input, or many other types of form identifiers consistent with the spirit and scope of the present invention for identifying the function and physical page of the form. Further, in certain embodiments not involving a form, the form identifier may be directly associated with the handwriting capture interface 200, thus enabling operation of the system 100 as described herein in the same manner as instances where a form is used. Accordingly, once the system 100 interfaces with the preprinted form based upon the identified function and page number, the system is able to interpret and act upon data entered through input fields associated with the preprinted form, for example, a handwriting input. In particularly advantageous embodiments of the present invention, the handwriting input is captured and stored by the computer software program product 500 as vector-based data including, in some instances, temporal factors, tactile factors, and/or other descriptive data characterizing the handwriting input in a manner consistent with the spirit and scope of the present invention.

Once the handwriting input is determined from the stylus position and the usage of the control input fields, the computer software program product 500 is capable of accessing specific data associated with the input. According to some embodiments of the present invention, the computer program product 500 may also convert or translate the handwriting input into text form using, for example, an automatic on-line handwriting recognizer or other translation system. However, in other embodiments, the handwriting input may be stored and further utilized without conversion into text. In still further instances, the handwriting input may be stored in its original form, in addition to being converted to text form and stored thereas by the computer program product 500, wherein either form, or both forms, of the handwriting input may be further utilized by the system 100. Some embodiments of the present invention may also allow the data fields to be alterable by the user. In addition, the computer software program product 500 may have the ability to time and/or date stamp any data entries as they are entered into the system 100. The system 100 is then able to process these data fields with respect to the time and/or date stamp tags. As these functions are executed, the computer software program product 500 also controls the user interface 400 such that information relevant to ongoing stylus or system 100 activities are displayed for the user. In a particularly advantageous embodiment, the computer software program product 500 is also capable of formatting, sending, receiving, and interpreting messages flowing through the external communications interface 600.

The external communications interface 600 is in communication with the central processing subsystem 300 and enables the system 100 to communicate with external computing devices in a unidirectional or bidirectional manner using an electronic messaging format. Generally, the electronic message is sent via a communications link 700 to an electronic message destination 800. Accordingly, the external communications interface 600 may be generic in terms of protocol and communication medium as is known to one skilled in the art. The communications link between the system 100 and the electronic message destination 800 may be either direct or indirect connections via wireline or wireless devices. The communications link 700 may comprise a variety of external communications links as well as a combination of these links such as, for example, wired serial interfaces, wired parallel interfaces, wireline modems, wireless modems, LAN connections, and WAN connections.

Figure 2:
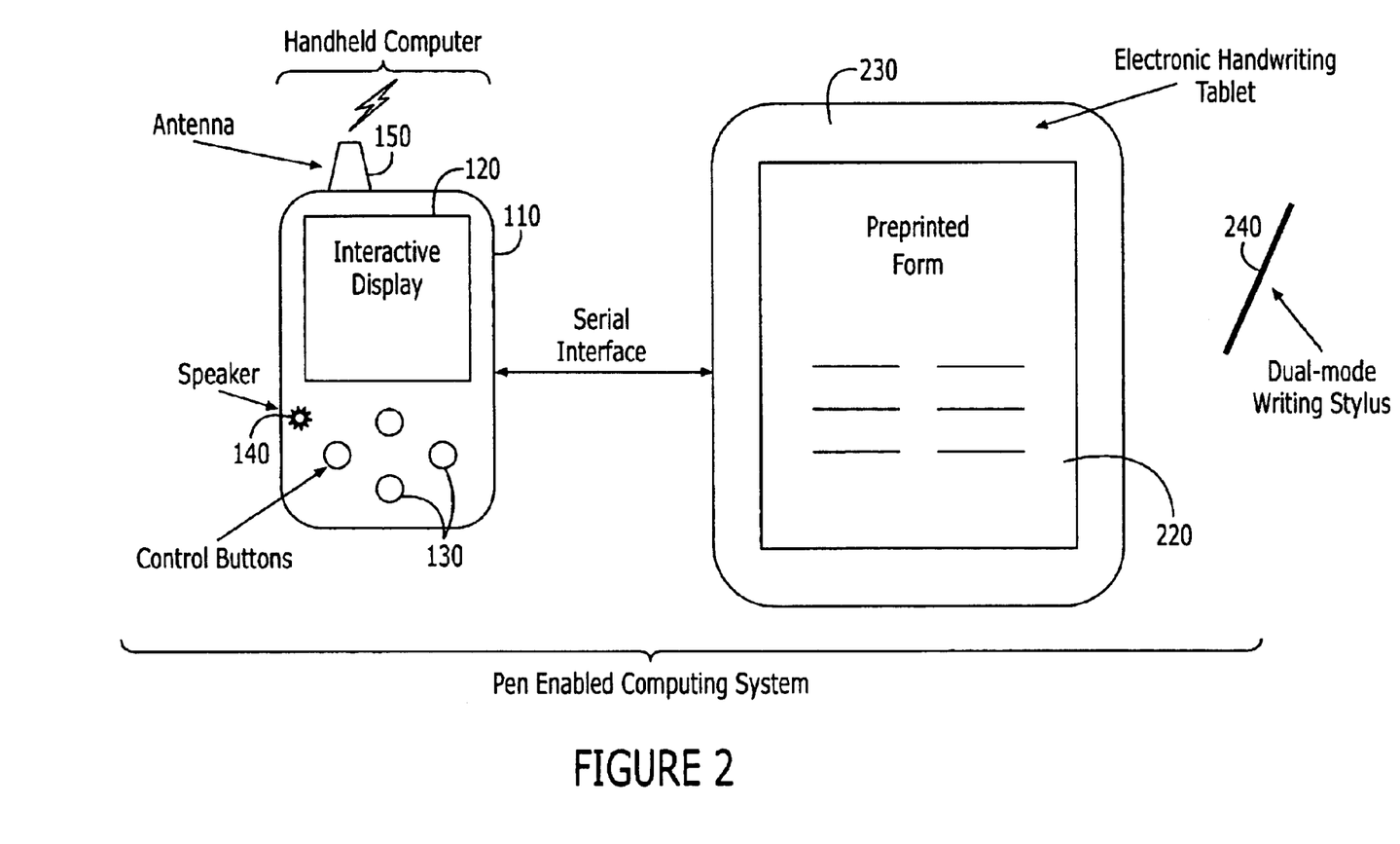
FIG. 2 is a schematic of a pen-enabled computing system according to one embodiment of the present invention.

One advantageous embodiment of a pen-enabled computing system 100 according to the present invention is shown in FIG. 2. A handheld computer component 110 such as, for example, a modified personal digital assistant (PDA) or a smart-phone provides most of the functionality of the system 100. Accordingly, the handheld computer component 110 comprises the central processing subsystem 300, the user interface 400, the computer software program product 500, and the external communications interface 600 as shown in FIG. 1. The user interface 400 may include an interactive display 120, one or more control buttons 130, and a speaker 140. The external communications interface 600 may include a wireless transceiver (not shown) and an antenna 150. In addition, the handwriting capture interface 200 comprises an electronic handwriting tablet 230 that is co-operable with one or more of a blank piece of paper 210 or a preprinted form 220. The electronic handwriting tablet 230 is serially interfaced with the handheld computer component 110. A dual-mode writing stylus 240 is employed by the user to form visible marks on the preprinted form 220, wherein the motion and position of the writing stylus 240 are also detectable by the electronic handwriting tablet 230.

A pen-enabled computing system according to the present invention may comprise many different combinations of components than the embodiment previously described. For example, an electronic handwriting tablet may be combined with a desktop personal computer, wherein the electronic handwriting tablet and the personal computer are physically connected via a wired interface and the personal computer has e-mail capabilities over a local area network (LAN). As another example, an electronic handwriting tablet may be combined with a laptop personal computer and a central server, wherein the electronic handwriting tablet and the personal computer are connected via a wireless interface and the personal computer has a network connection to the central server via a LAN. The central server is further capable of sending application-specific messages to various application servers. Thus, a pen-enabled computing system may be accomplished in many different manners consistent with the spirit and scope of the present invention.

In accordance with the embodiments of the present invention, a purpose of the pen-enabled computing system is to communicate with an external computing device via an electronic message. An electronic message may comprise, for example, a source address, a destination address, a subject, a time stamp, and a payload. The source address may be, for example, a unique signature code assigned to the originator of an electronic message, whereas a destination address is a unique signature code assigned to an intended recipient of the electronic message. The subject is a textual or otherwise visually discernable phrase intended to describe the basic purpose of a message, while the time stamp is generally the time and date at which the electronic message is transmitted. The payload may be considered the body of the message and is typically a textual or graphical informational element. The term payload may apply to the text of a conventional electronic mail message as well as any attachment, which is appended to and transmitted along with the basic message. In a particularly advantageous embodiment of the present invention, payload comprises at least a portion of the handwriting input captured by the handwriting capture interface 200, wherein the handwriting input is established as the message payload. However, the message payload may also comprise any application-specific information embedded within the message. For example, application-specific information may be data embodied in different forms, such as text and/or graphics, and may include a function or application that is able to initiate a request to a destination server that triggers a return message to the source server, functional parameters used by applications hosted at the destination, and/or instructions for message processing once the message is received by the message recipient. In addition, payload may also comprise, for example, application-specific information employed in a web-based transaction that is embedded into the data fields of an HTTP POST request.

Figure 3:
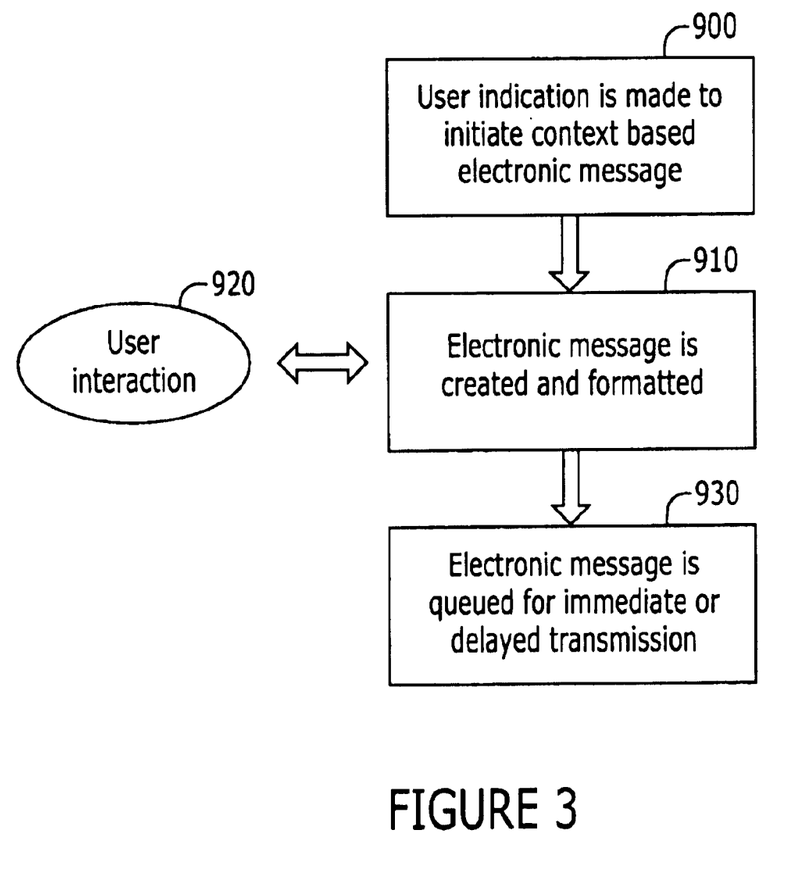
FIG. 3 is a flowchart of the operations performed to produce a contextual electronic message from an input to a pen-enabled computing system according to one embodiment of the present invention.

FIG. 3 shows a method for producing a contextual electronic message from an input to a pen-enabled computing system according to one embodiment of the present invention. According to embodiments of the present invention and as used herein, the term "contextual electronic message" refers to an electronic message formed on the basis of the particular preprinted form used within the system and the context of the handwriting input. For example, if a page from a daily planner comprises the preprinted form and the handwriting input is an entry at a particular appointment slot on that page, the context of the handwriting input is an appointment or meeting at a certain date and time, wherein the date is determined from the form identifier on the particular page of the daily planner and the time from the particular appointment slot. Based upon the input context determined by the system, an associated contextual electronic message may be formed which may state, for example: "[Sender] requests your presence at a meeting on [date] at [time] regarding [handwriting input]." In accordance with various embodiments of the present invention, context may be affected by, for example, the particular form and/or sub-area thereof manipulated by the writing stylus, the user profile, characteristics of the message recipient, the particular series and/or order therein of user actions, and/or the characteristics of the user actions.

Accordingly, a user of a pen-enabled computing system first performs an initiating action to initiate the creation of a contextual electronic message by the system (block 900). For example, the user may check a messaging box contained within a specific sub-area of the preprinted form overlying the electronic handwriting tablet or directly on the electronic handwriting tablet. Alternatively, the user may circle one or more fields contained within a specific sub-area of the preprinted form. In still another embodiment of the present invention, the user may select an electronic messaging icon that exists on the preprinted form such as, for example, an envelope icon appearing on the form, wherein each distinct sub-area of the form could have its own messaging icon. Further, in yet another embodiment of the present invention, the user may be required to activate a control button associated with the initiation of an electronic message. The user may, for example, be prompted by the user interface to select a messaging option using associated control buttons.

Once the user initiates the formation of the contextual electronic message, the pen-enabled computing system creates and formats the desired electronic message (block 910). The electronic message may be based upon the context of the specific sub-area of the preprinted form, wherein such sub-areas may include parameters indicating the type of form, a page number of the form, or the type of field within the form. In one particularly advantageous embodiment of the present invention, the process of developing the electronic message may be interactive, with the user interacting with the pen-enabled computing system through the stylus and/or the user interface components comprising, for example, an interactive display, appropriate control buttons, or the like (block 920). Once the electronic message is formed, it may be assigned a time stamp from a variety of methods that are known in the art. In a similar manner, the source address for the electronic message may be determined from data existing on the pen-enabled computing system such as, for example, a user profile. The destination address(es) may then be determined from the context of the message. For example, messages of a certain context may be flagged for transmission to a known group of addressees. Alternatively, the destination address(es) may be determined through user selections via the stylus, components of the user interface, and/or the preprinted form, wherein the destination address(es) may be explicitly input by the user or retrieved from the memory of the system or other source. Similarly, the subject of the message may be implicitly determined from the context of the message or explicitly determined via user interaction with the user interface. For example, the subject may be created from electronic ink entered by the user into the system via the stylus. The message body and/or an attachment comprising the payload of the electronic message may then be determined explicitly by the user or implicitly through the context of the message. In a particularly advantageous embodiment of the present invention, the payload comprises at least a portion of the handwriting input captured by the handwriting capture interface 200, wherein the handwriting input is established as the message payload. Where the electronic message includes embedded application-specific information, such information may be determined implicitly via the context of the electronic message associated with the particular sub-area of the form.

After the electronic message is formed and formatted, it is queued for transmission to the destination address(es) (block 930). In some instances, the message may be transmitted after a small delay, wherein the message is essentially transmitted immediately, or the message may be stored for a period of time before it is transmitted to the destination address.

The above described system, computer software program product, and method for producing a contextual electronic message from an input to a pen-enabled computing system according to embodiments of the present invention may be more particularly illustrated by example. The following examples may be implemented with various embodiments of a pen-enabled computing system such as the embodiment illustrated in FIG. 2. Accordingly, reference is made to FIG. 2 in connection with the examples illustrated in FIGS. 4A–4E in describing some of the possible functions of embodiments of the invention.

Figure 4A:
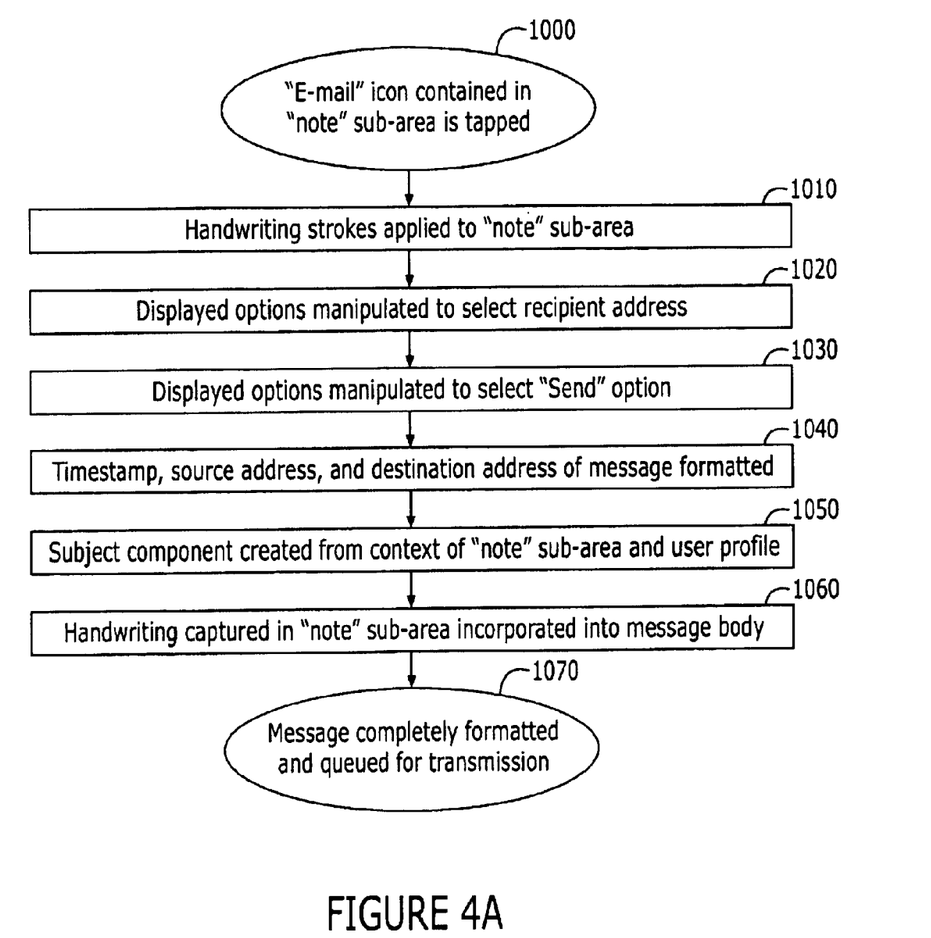
FIGS. 4A–4E are flowcharts of exemplary applications of the operations performed to produce a contextual electronic message from an input to a pen-enabled computing system according to one embodiment of the present invention.

FIG. 4A is a flowchart illustrating a method of inserting a handwritten note into an electronic mail message according to one embodiment of the present invention. According to this embodiment, the preprinted form 220 overlying the electronic handwriting tablet 230 comprises an e-mail icon, which is selected by the user as the initiating action for initiating an electronic mail message (block 1000). The e-mail icon may be located, for example, in a "Note" sub-area of the preprinted form 220. Selection of the e-mail icon may be acknowledged by a signal transmitted to the user through the user interface such as, for example, by an audio signal through the speaker 140. The audio signal acknowledgement further signifies that any writing on the preprinted form 220 is subsequently captured for use in a messaging action. The user then applies writing strokes to the preprinted form 220 using the writing stylus 240 (block 1010). The interactive display 120 may further offer menu options for selecting, for example, the destination address (es) (block 1020) and/or message transmission options. Selection of a particular menu option may be acknowledged by an audio signal, wherein, for example, choosing a "Send" option (block 1030) is indicated by an audio signal indicating the termination of the handwriting capture on the preprinted form 220 and preparation of the electronic message for transmission to the intended recipient. Other components may be included in the electronic message from the context of the data entered into the "Note" sub-area and from the profile of the user, the additional components including, for example, a time stamp, a source address, and a subject (blocks 1040 and 1050). The captured handwriting segment is then encoded and incorporated into the payload of the message (block 1060). In some instances, the captured handwriting segment may be incorporated into the message as captured or, alternatively, after conversion into text. Once the message is formed and formatted, it is queued for transmission to the selected recipient (block 1070).

Figure 4B:
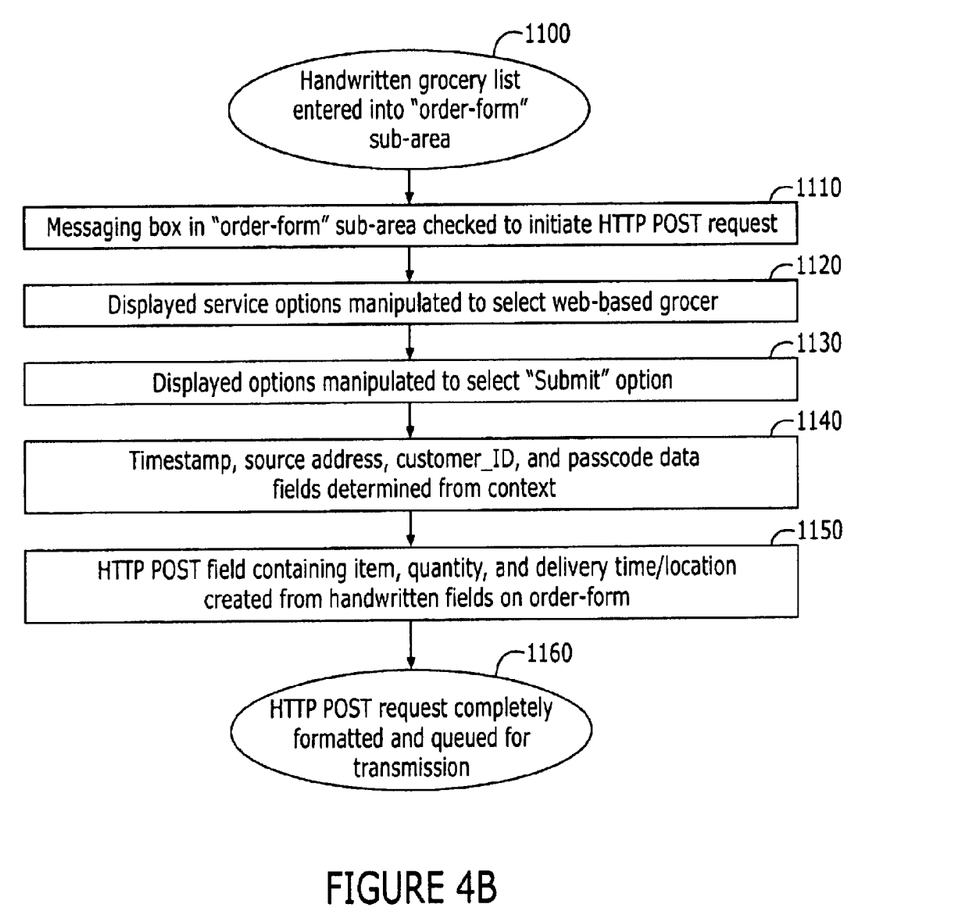

FIG. 4B is a flowchart illustrating a method of incorporating a handwritten order form into an Internet request to a web-based grocery service according to an alternative embodiment of the present invention. First, a handwritten grocery list is entered into an "Order Form" sub-area of a preprinted form 220 engaging an electronic handwriting tablet 230 utilizing a writing stylus 240 (block 1100). A message-initiating box in the "Order Form" sub-area is then selected by the user to initiate an HTTP POST request (block 1110). The checking of the message box may be acknowledged by an audio signal transmitted to the user through the speaker 140. The interactive display 120 may then display menu options for selecting a destination address such as, for example, a desired grocery service, wherein the user's selection is acknowledged through the user interface (block 1120). The user is then presented with transmission options where, after selecting the "Submit" option (block 1130), additional information such as a time stamp, source address, customer identification, and pass code data are implicitly determined from the context of the data entered by the user (block 1140) and moved into HTTP POST request fields. Another HTTP POST request field is then created from the handwritten fields of the order form and may contain such data as the item, quantity, delivery time and/or location requested by the user (block 1150), wherein such data may remain in the electronic ink format from the captured handwriting input. A complete HTTP POST request may then be constructed and queued for transmission to the selected grocery service (block 1160). In this instance, the HTTP POST request comprises the electronic message which is sent with application-specific embedded information in the form of, for example, the customer identification and the pass code data.

Figure 4C:
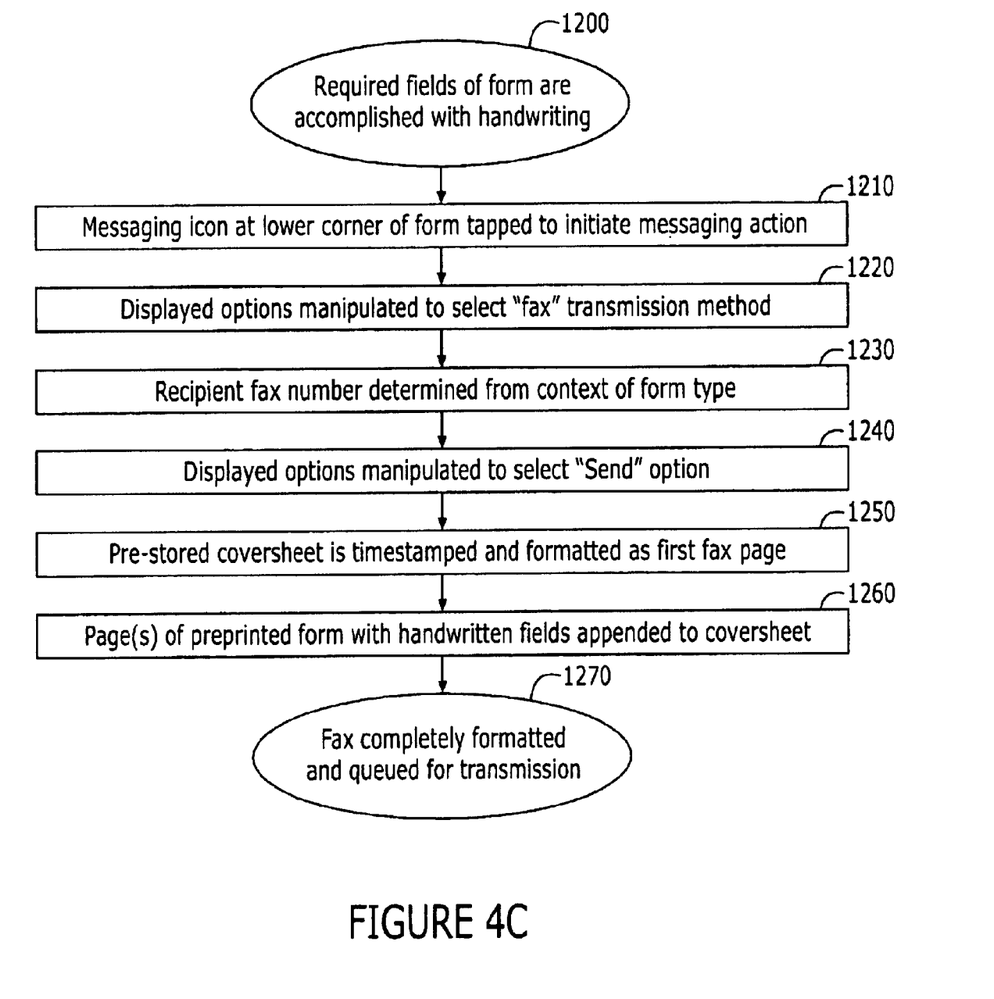

FIG. 4C is a flowchart illustrating a method of translating a preprinted form containing handwritten fields into a facsimile message, for example, where an insurance agent may wish to fax a preliminary copy of a damage assessment report, according to an alternate embodiment of the present invention. First, the user completes all required sub-areas of the preprinted form 220 using the writing stylus 240 (block 1200). The user then selects a messaging icon, indicating the commencement of a messaging action (block 1210), and is prompted to select the method of transmission of the electronic message (block 1220). Upon selecting the "Fax" option, the fax number of the recipient may be entered by the user or determined from the context of the type of preprinted form 220 (block 1230). Once the message is completed, the user selects a "Send" option (block 1240). A pre-stored coversheet is then time stamped and formatted as the first page of the facsimile (block 1250) before the handwritten fields from the preprinted form are appended to the coversheet to complete the facsimile (block 1260). The completed fax is then formatted and queued for transmission to the selected recipient (block 1270).

Figure 4D:
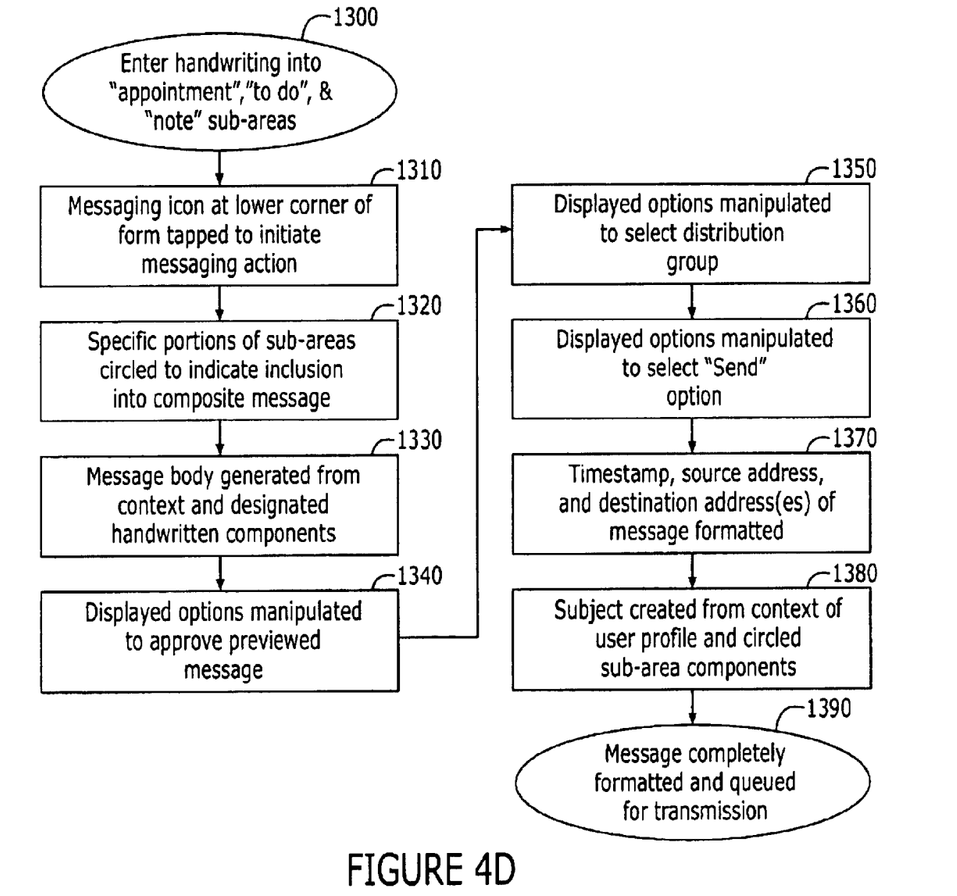

As a further example, FIG. 4D is a flowchart illustrating a method of generating a meeting invitation from circled portions of a daily planner form according to yet another alternate embodiment of the present invention. First, handwritten information is entered into several sub-areas of a preprinted planner form 220. The handwritten information may comprise, for example, an appointment in a specific slot of an appointment sub-area, an associated task into a specific slot of a to-do list sub-area, and/or a freestyle sketch into a note sub-area (block 1300). After the user initiates a messaging action (block 1310), the user is able to circle one or more specific portions of the completed sub-areas to select portions of the handwritten data to be included in the electronic message (block 1320). The circled portions may include, for example, a specific appointment slot, an associated task, a freestyle sketch, and/or portions or combinations thereof. After the context of the form 220 is determined, a message body is generated (block 1330) from the context of the preprinted form 220 and/or the designated handwritten components. Alternatively, in some instances, at least a portion of the message body may be automatically generated from the context of the form 220.

Accordingly, a meeting invitation is formed which includes a message body which may indicate, for instance, that the recipient is invited to a meeting on the appointment date from the specified appointment slot, with the message also showing the date, time, and purpose of the meeting. The selected associated task and the freestyle sketch may accompany the meeting invitation as related information for the recipient. A signature box may be added to the electronic message as implicitly determined from a user profile. Once the message is formed, the user is presented with menu options for manipulating and/or approving the previewed message (block 1340). The user then selects the intended distribution group (block 1350) before the user selects the "Send" option (block 1360) to complete the electronic message. Additional information such as a time stamp, source address, and subject are then added to the message, along with the destination address(es) from the context of the form, the user profile, and/or selected sub-area components (blocks 1370 and 1380). The message is then formatted and queued for transmission (block 1390).

Figure 4E:
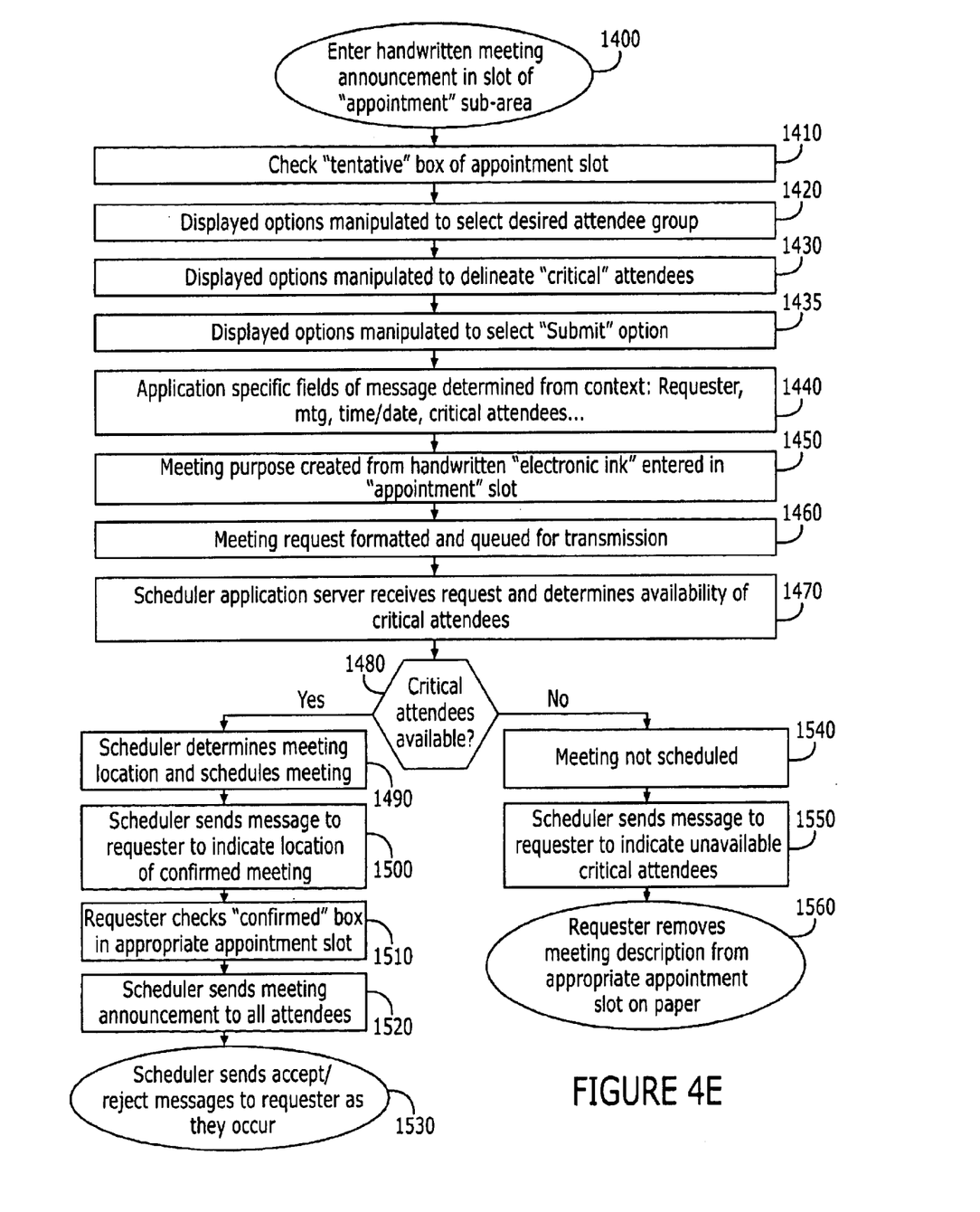

FIG. 4E is a flowchart illustrating a method of establishing a meeting via a central scheduler application server according to still another alternate embodiment of the present invention. First, the user enters a handwritten meeting announcement in a specific slot of an appointment sub-area of a preprinted planner form 220 (block 1400). The user then checks the appropriate box in the appointment slot to indicate that the scheduled meeting is being tentatively scheduled (block 1410) before being presented with menu options for allowing the user to select the desired group of attendees (block 1420). In some instances, the attendees may be separated into critical and non-critical attendees (block 1430). After the user selects the "Submit" option (block 1435), the message is formed with the necessary information such as a time stamp, the requestor's name, the meeting date and time, the addresses of all attendees, and any indication of the criticality of the attendee. This necessary information may be implicitly determined from the context of the preprinted form 220 and the user profile (block 1440). The subject or purpose of the meeting is then created from the handwritten electronic ink entered in the appointment slot of the planner form 220 (block 1450) before the meeting request is formatted and queued for transmission (block 1460). Since the meeting was tentatively scheduled, the application-specific embedded information determined from the context of the entries in the preprinted form 220 directs the central scheduler application server to determine the availability of the critical attendees (blocks 1470 and 1480). If the critical attendees are determined to be available, the central scheduler application server determines the appropriate meeting location and proceeds to schedule the meeting (block 1490). A return message is then sent to the user/requestor to indicate the location of the confirmed meeting (block 1500). The user is thereafter prompted to confirm the scheduled meeting (block 1510) before the central scheduler application server transmits the meeting announcement to all of the listed attendees (block 1520). The central scheduler application server may further be able to receive the accept/reject return messages from the listed attendees and forward them to the user as they are received (block 1530). However, should any of the critical attendees not be available for the requested meeting, the meeting is not scheduled (block 1540) and the central scheduler application server sends a message to the user/requestor to indicate which critical attendees are unavailable (block 1550). The user is then able to cancel the tentative meeting by removing the meeting description from the appointment slot on the planner form (block 1560).

Thus, as shown and described herein, a system, computer software program product, and method for producing a contextual electronic message from an input to a pen-enabled computing system according to embodiments of the present invention provides a system capable of utilizing a handwriting input for subsequent purposes, wherein the handwriting input may or may not be translated into text form. In addition, embodiments of the present invention provides improved seamless and automated operation of a pen-enabled computing system, in some instances utilizing a preprinted form, in the form of new applications for further expanding the capabilities of such a pen-enabled computing system. Thus, a system, computer software program product, and method for producing a contextual electronic message from an input to a pen-enabled computing system according to embodiments of the present invention provides distinct advantages over prior art processes as disclosed herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for producing a contextual electronic message from an input received by a handwriting capture device, said system comprising:

a handwriting capture device capable of receiving and capturing an electronic handwriting input;

a user interface adapted to interact with a user, the user interface being capable of receiving a user input to initiate a processing function;

a central processing unit in communication with the handwriting capture device and the user interface, the central processing unit being capable of determining the context of the handwriting input and application-specific information associated therewith, the central processing unit also being capable of processing the handwriting input in accordance with at least one of the context and the initiated processing function to produce a contextual electronic message, the contextual electronic message comprising at least one of a portion of the application-specific information and a portion of the handwriting input;

a communications interface In communication with the central processing unit and adapted to interact with a message recipient through a communications link such that the electronic message is transmittable thereby; and a computer software program product executing in at least one of the handwriting capture device and the central processing unit, the computer program product for capturing the handwriting input, determining the context thereof, determining the application-specific information associated with the handwriting input context, processing the handwriting input according to the context and the initiated processing function to produce the corresponding contextual electronic message, and transmitting the message via the communications interface, wherein the computer program product is capable of using the application-specific information to determine a status of the message recipient prior to transmitting the electronic message.

2. A system according to claim 1 wherein the handwriting capture device comprises a writing stylus having an associated sensing device for selectively sensing stylus movements.

3. A system according to claim 2 wherein the sensing device comprises at least one of a pen-enabled computer, an electronic handwriting tablet, and a device that cooperates with the writing stylus to generate data from which the position and movement of the writing stylus can be determined.

4. A system according to claim 1 wherein the user interface comprises at least one actuator capable of receiving the user input and initiating the corresponding processing function.

5. A system according to claim 4 wherein the user interface further comprises at least one indicator adapted to provide data to the user.

6. A system according to claim 1 wherein the central processing unit comprises at least one of a pen-enabled computer, a personal digital assistant, a smart phone, a desktop personal computer, a laptop personal computer, and a central server.

7. A system according to claim 1 wherein the communications interface is at least one of a wireless communications device and a wireline communications device adapted to provide a communications link between the system and an external computing device.

8. A system according to claim 1 wherein the electronic message further comprises at least one of a source address, a destination address, a subject, a time stamp, and a payload, wherein at least a portion of the payload comprises at least one of the application-specific information and at least a portion of the handwriting input.

9. A computer software program product executing within a messaging system, the computer program product capable of producing a contextual electronic message from an input received by a handwriting capture device, the computer program product comprising:

a first executable portion capable of receiving and capturing a handwriting input entered into a handwriting capture device, the handwriting input having a predetermined input parameter;

a second executable portion capable of determining the context of the handwriting input based at least partially upon the input parameter and determining application-specific information associated with the handwriting input context;

a third executable portion capable of processing the handwriting input based on at least one of a user input to a user interface and the handwriting input context to form a contextual electronic message comprising at least one of a portion of the application-specific information and a portion of the handwriting input;

a fourth executable portion capable of transmitting the message via a communications interface, the communications interface being adapted to interact with a message recipient through a communications link; and a fifth executable portion capable of controlling the communications interface and directing the communications interface to interact with the message recipient, the fifth executable portion being capable of polling a status of the message recipient with respect to the contextual electronic message prior to transmitting the message.

10. A computer software program product according to claim 9 wherein the messaging system comprises a central processing unit in communication with the handwriting capture device, the user interface, and the communications interface.

11. A computer software program product according to claim 10 wherein at least one executable portion is executed within the central processing unit, the central processing unit comprising at least one of a pen-enabled computer, a personal digital assistant, a smart phone, a desktop personal computer, a laptop personal computer, and a central server.

12. A computer software program product according to claim 9 wherein at least one executable portion is executed within the handwriting capture device, the handwriting capture device comprising at least one of a pen-enabled computer, an electronic handwriting tablet, a writing stylus having an associated sensing device for selectively sensing stylus movements, and a device that cooperates with the writing stylus to generate data from which the position and movement of the writing stylus can be determined.

13. A computer software program product according to claim 9 wherein the input parameter comprises a form identifier and the second executable portion is capable of determining the handwriting input context at least partially from the form identifier.

14. A computer software program product according to claim 9 wherein at least one executable portion is capable of associating the application-specific information with an executable function.

15. A computer software program product according to claim 9 wherein at least one executable portion is capable of controlling the user interface and directing the user interface to display data associated with the handwriting input context, the user interface having at least one indicator adapted to provide the data to a user.

16. A computer software program product according to claim 9 wherein at least one executable portion is capable of assigning at least one of a time stamp and a date stamp to the handwriting input.

17. A computer software program product according to claim 9 wherein at least one of the executable portions is capable of assessing the status of the message recipient and executing a predetermined function associated with the assessed status.

18. A method for producing a contextual electronic message from a handwriting input to a handwriting capture device, the method comprising:

receiving and capturing a handwriting input entered into a handwriting capture device, the handwriting input having a predetermined input parameter;

determining the context of the handwriting input based at least partially upon the input parameter;

determining application-specific information associated with the handwriting input context;

receiving a user input from a user interface;

forming a contextual electronic message based on at least one of the handwriting input context and the user input, the electronic message comprising at least one of a portion of the application-specific information and a portion of the handwriting input;

polling a status of a message recipient with respect to the contextual electronic message prior to transmitting the message; and transmitting the message via a communications interface adapted to interact with a message recipient through a communications link.

19. A method according to claim 18 wherein capturing a handwriting input further comprises selectively sensing movements of a writing stylus with a handwriting capture device comprising at least one of a pen-enabled computer, an electronic handwriting tablet, a writing stylus having an associated sensing device, and a device that cooperates with the writing stylus to generate stylus movement data.

20. A method according to claim 18 wherein the input parameter comprises a form identifier and the method further comprises determining the handwriting input context at least partially from the form identifier.

21. A method according to claim 18 further comprising associating the application-specific information with an executable function.

22. A method according to claim 18 further comprising displaying data associated with the handwriting input context via the user interface, the user interface having at least one indicator adapted to provide the data to a user.

23. A method according to claim 18 further comprising assigning at least one of a time stamp and a date stamp to the handwriting input.

24. A method according to claim 23 wherein forming a contextual electronic message further comprises forming a contextual electronic message based on and comprising at least one of the time stamp and the date stamp.

25. A method according to claim 18 further comprising assessing the status of the message recipient and executing a predetermined function associated with the assessed status.

26. A method according to claim 18 wherein forming a contextual electronic message further comprises forming a contextual electronic message comprising at least one of a source address, a destination address, a subject, a time stamp, and a payload, wherein at least a portion of the payload comprises at least one of the application-specific information and at least a portion of the handwriting input.

* * * * *